United States Patent [19]

Ishikawa et al.

[11] Patent Number: 5,497,267
[45] Date of Patent: Mar. 5, 1996

[54] VIDEO MICROSCOPE

[75] Inventors: Seiji Ishikawa, Sagamihara; Hajime Murakami, Odawara, both of Japan

[73] Assignee: Mitsubishi Chemical Corporation, Tokyo, Japan

[21] Appl. No.: 64,444

[22] Filed: May 21, 1993

[51] Int. Cl.$^6$ ............................ G02B 21/06; G02B 21/36
[52] U.S. Cl. ..................... 359/390; 359/363; 359/380; 359/387
[58] Field of Search ................................. 359/362–363, 359/368–369, 380, 383, 385, 387–393, 432; 250/214 VT; 348/65, 68–70, 79–80

[56] References Cited

U.S. PATENT DOCUMENTS

| | | | |
|---|---|---|---|
| 1,418,645 | 6/1922 | Hensoldt | 359/380 |
| 4,208,089 | 6/1980 | Netto | 359/363 |
| 4,643,540 | 2/1987 | Kawasaki et al. | 359/385 |
| 4,756,610 | 7/1988 | Clark et al. | 359/380 |
| 4,922,092 | 5/1990 | Rushbrooke et al. | 250/214 VT |

FOREIGN PATENT DOCUMENTS 2406644  8/1973  Germany ........................ 359/385

Primary Examiner—Thong Q. Nguyen
Attorney, Agent, or Firm—Oblon, Spivak, McClelland, Maier, & Neustadt

[57] ABSTRACT

A video microscope capable of optionally and continuously varying image pickup magnifying power of an observed object over a wide range without requiring replacement of a lens. A lens barrel in which a lens system is arranged is slidably positionally adjusted relative to an observation stand in which an illuminating light source is arranged by means of an objective distance adjusting mechanism, to thereby adjust a relative distance between the observed object and an objective side of the lens system. Also, a cylinder of a video signal converting section in which a two-dimensional CCD element is provided is slidably positionally adjusted relative to the lens barrel by means of an enlargement (reduction) magnification and focus adjusting mechanism, resulting in desired magnifying power of the observed object being readily obtained.

5 Claims, 6 Drawing Sheets

VIDEO MICROSCOPE

BACKGROUND OF THE INVENTION

1. Field of the Art

This invention relates to a video microscope, and more particularly to an improvement in a video microscope adapted to optionally and continuously vary image pickup magnification of an object or magnifying power at which an image of an object to be observed is to be picked up over a wide range without requiring replacement of a lens.

2. Description of the Related Art

A conventional video microscope of such a type is generally constructed in a prefocus type manner of keeping a lens system stationary with respect to an object to be observed (hereinafter referred to as "observed object"). Unfortunately, such construction causes a variation in enlargement (reduction) magnification or magnifying power of an image to be picked up to require replacement of the lens system itself.

Also, as a means for varying enlargement (reduction) magnification of an image to be picked up, a zoom lens system has been often employed.

The above-described prefocus construction for varying the enlargement (reduction) magnification or magnifying power is inconvenient, because replacement of the lens system is required every time the variation is to be carried out. Also, the prefocus construction has another disadvantage that it is required to previously prepare lens systems suitable for enlargement (reduction) magnification desired. The latter means or zoom lens arrangement fails to vary the magnification or magnifying power over a wide rage because a variation in magnifying power of the zoom lens system is limited to a narrow range as small as 3 to 4 magnifications.

SUMMARY OF THE INVENTION

The present invention has been made in view of the foregoing disadvantages of the prior art.

Accordingly, it is an object of the present invention to provide a video microscope which is capable of optionally and continuously varying image pickup magnification or magnifying power of an observed image over a wide range without requiring replacement of a lens and the like.

In accordance with the present invention, a video microscope is provided. Generally speaking, the video microscope of the present invention is so constructed that a lens barrel is slidably positionally adjusted relative to an observation stand, the observation stand includes an illuminating light source arranged to light an observed object by means of an objective distance adjusting mechanism to adjust a relative distance between the observed object and an objective side of the lens system. A cylinder of a video signal converting section in which a two-dimensional CCD element is arranged is slidably positionally adjusted relative to the lens barrel by means of an enlargement (reduction) magnification and focus adjusting mechanism to obtain desired enlargement (reduction) magnification or magnifying power of the observed object.

More particularly, the video microscope of the present invention includes an observation stand of which both ends are open and of which one of both ends faces an observed object. A illuminating light source, arranged in the observation stand, lights the observed object. A lens barrel is provided at one end thereof with a lens system and slidably fitted in the observation stand through the other open end of the observation stand. The lens system is positioned on an image pickup optical path of the observed object and the lens barrel has the other end which is open. The video microscope also includes a video signal converting section including a cylinder. The cylinder of the video signal converting section has a two-dimensional CCD element and a driving circuit for the CCD element provided therein in a manner to be arranged at a predetermined position corresponding to the lens system and is slidably fitted in the lens barrel through the other open end of the lens barrel, an objective distance adjusting mechanism arranged between the observation stand and the lens barrel to adjust a distance between the observed object and an objective side of the lens system, and an enlargement (reduction) magnification and focus adjusting mechanism arranged between the lens barrel and the cylinder of the video signal converting section to vary and adjust enlargement (reduction) magnification or magnifying power of the lens system and adjust focus of the lens system.

In the video microscope of the present invention constructed as described above, a relative distance between the lens system and the observed object can be adjusted by the objective distance adjusting mechanism and the setting of magnification and focus of the lens system can be adjusted by the enlargement (reduction) magnification and focus adjusting mechanism, so that an image of the observed object lighted by the illuminating light source may be clearly projected on the two-dimensional CCD element at magnification or magnifying power desired, resulting in being readily picked up.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
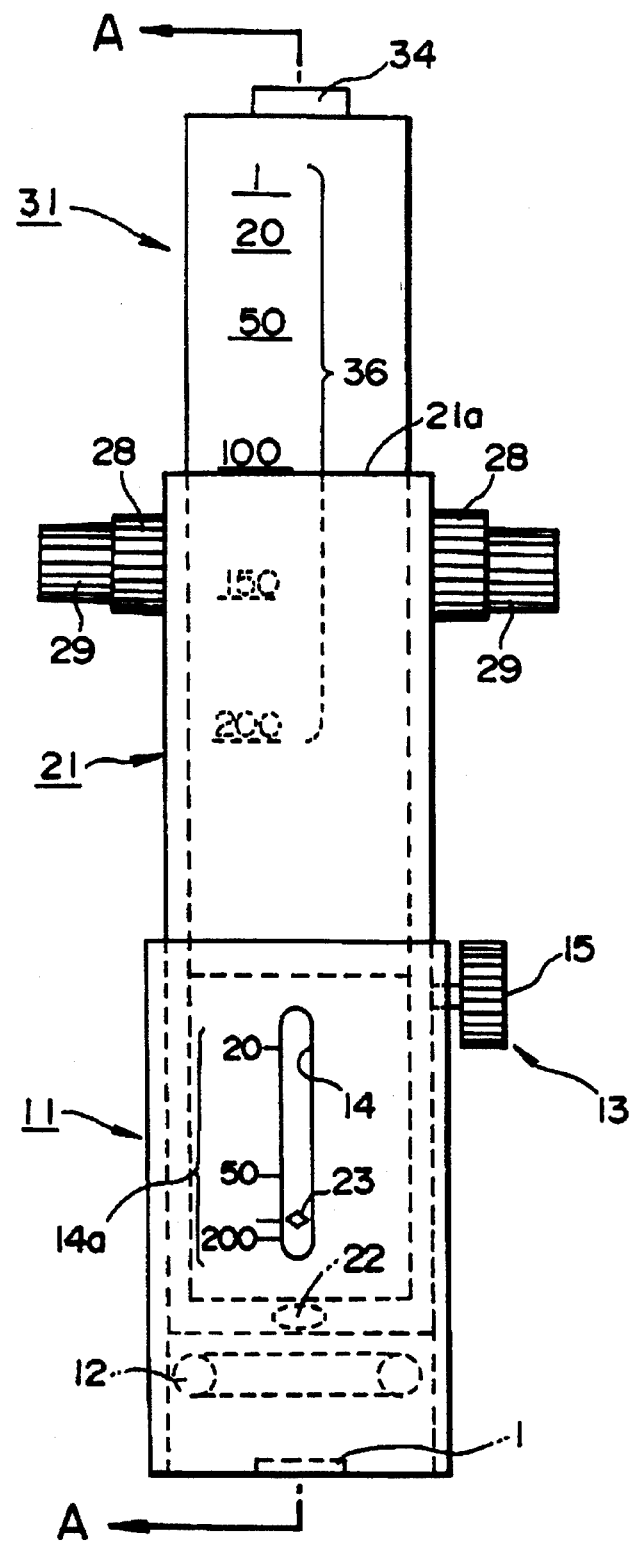
FIG. 1 is a front elevation view generally showing an embodiment of a video microscope according to the present invention.
Figure 2:
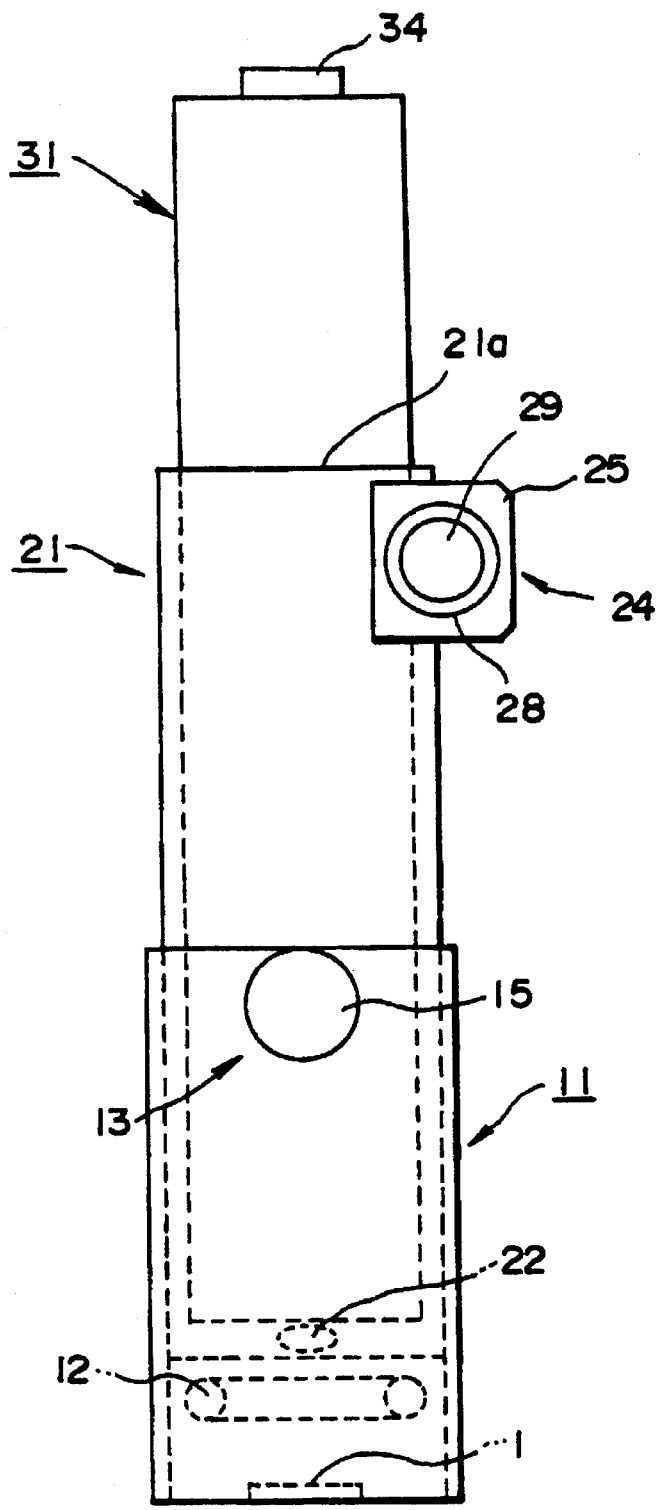
FIG. 2 is a side elevation view of the video microscope shown in FIG. 1.
Figure 3:
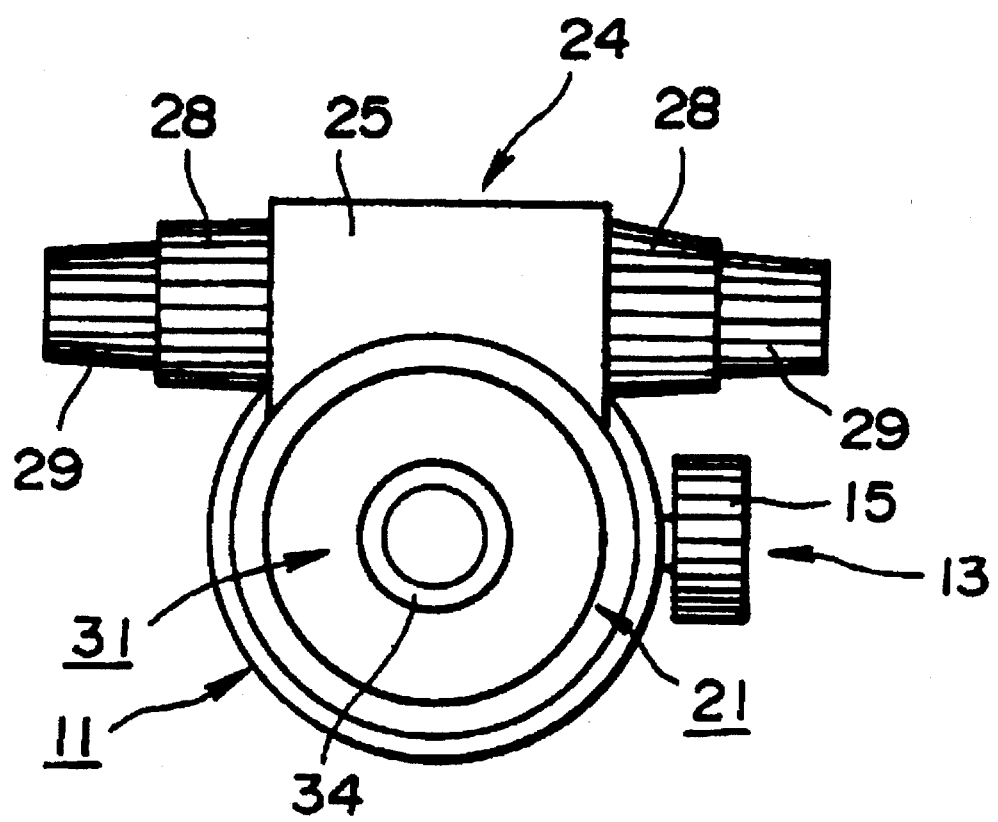
FIG. 3 is a plan view of the video microscope shown in FIG. 1.
Figure 4:
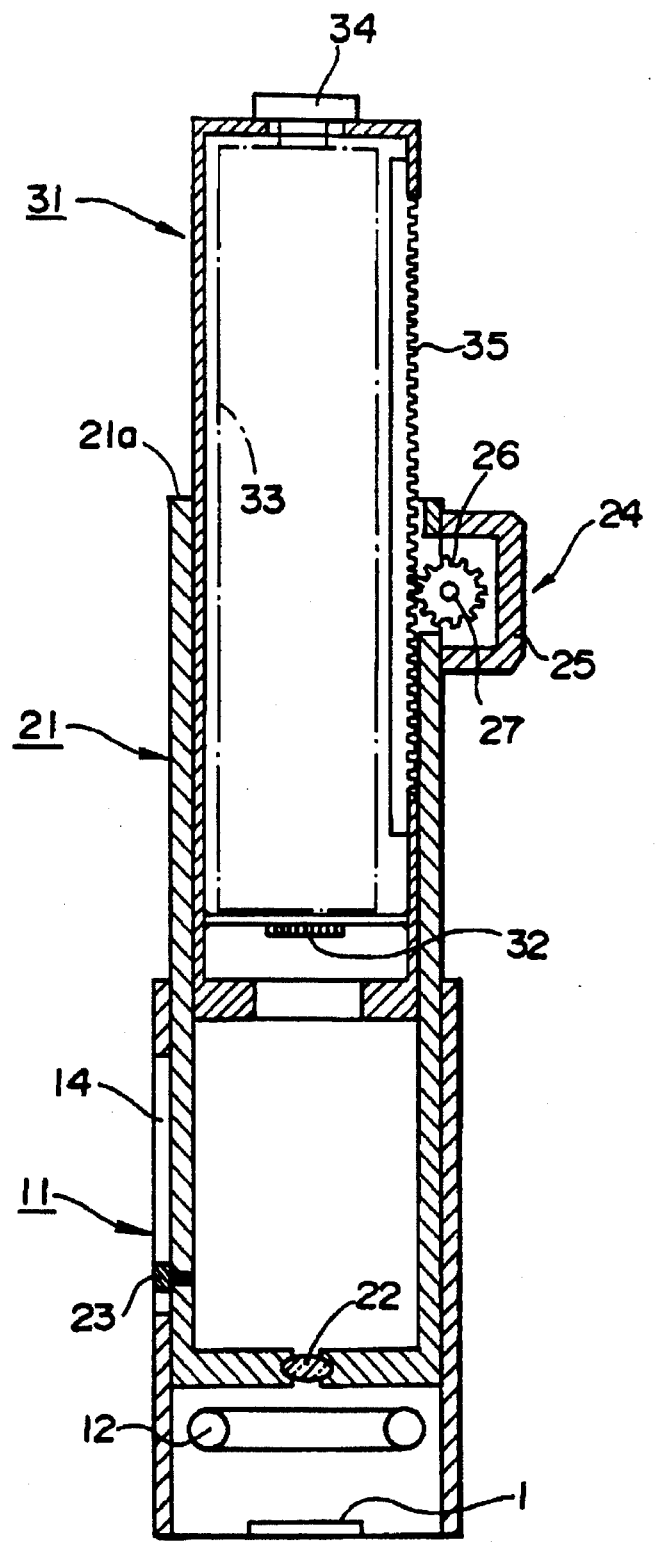
FIG. 4 is a vertical sectional view taken along line A—A of FIG. 1.

Now, a video microscope according to the present invention will be described hereinafter with reference to the accompanying drawings.

Referring first to FIGS. 1 to 4, an embodiment of a video microscope according to the present invention is illustrated. A video microscope of the illustrated embodiment includes an observation stand 11 formed into a hollow cylindrical shape and disposed in a relationship of being stationary with respect to an observed object 1 for observing an enlarged or reduced image of the object 1. Thus, the observation stand 11 is open at both ends thereof in an axial direction thereof. The video microscope also includes a lens barrel 21 in which a lens system is arranged on an image pickup optical path of the video microscope defined in an axial direction thereof. The lens barrel 21 is open at one end or an upper end thereof. In the illustrated embodiment, the lens system comprises a convex lens 22 exhibiting an objective function. The video microscope further includes a video signal converting section including a cylinder 31, which is open at one end thereof. The cylinder 31 of the video signal converting section is provided in the open end thereof with a two-dimensional CCD element 32, which is arranged on a predetermined position defined on the image pickup optical path aligning the convex lens 22 with the object. Also, the cylinder 31 is provided therein with a driving circuit 33 and the like for the CCD element 32 and mounted at the other end thereof with a cable connector 34 which permits inputting of a drive/control signal of the driving circuit 33 or the like and outputting of a video signal processed by the driving circuit 33 or the like to be carried out therethrough.

In the video microscope generally constructed as described above, the observation stand 11, as described above, is formed into a hollow cylindrical shape, resulting in being open at both ends thereof. The observation stand 11 is formed into dimensions which permit the observed object to be received in the open one or lower end of the observation stand 11. Further, the observation stand 11 is provided therein with an illuminating light source 12 of a ring-like shape for illuminating or lighting the observed object 1. The illuminating light source 12 is arranged in proximity to the open one or lower end of the observation stand 11. In the observation stand 11 is fitted the above-described lens barrel 21 through the other open end or upper open end of the observation stand 11 in a manner to be slidable in an axial direction thereof while relatively tightly contacting with an inner surface of the observation stand 11. Between the observation stand 11 and the lens barrel 21 is arranged an objective distance adjusting mechanism 13 for finely adjusting a relative distance between the observed object 1 received in the open lower end of the observation stand 11 and the convex lens 22.

The illuminating light source 12 is desirably constructed so as not to cause thermal oxidation during the illumination. The illuminating light source 12 is not limited to a ring-like shape, a lamp and the like so long as it can effectively light the observed object 1. For example, it may be an optical fiber connected to an external light source.

In the illustrated embodiment, the objective distance adjusting mechanism 13 may be constructed in the following manner. More particularly, the observation stand 11 is formed on a front side thereof with an elongated opening 14 extending in the axial direction thereof and provided with an objective distance scale 14a, which is arranged so as to extend along the elongated opening 14 and correspond to enlargement or reduction magnification or magnifying power. Also, the observation stand 11 is threadedly mounted on one side thereof with a fixing knob 15 for objective distance adjustment and also acts as a stopper. The lens barrel 21 is provided thereon with an indication 23 which is fitted in the opening 14 of the observation stand 11. In the objective distance adjusting mechanism 13 thus constructed, a relative distance between the lens barrel 21 and the observation stand 11 and therefore a relative distance between the observed object 1 and an objective side of the convex lens 22 are finely adjusted as desired while keeping the fixing knob 15 loosened. Then, the fixing knob 15 is tightened to keep the adjusted distance fixed.

The objective distance adjusting mechanism 13 may be constructed in any other suitable way so long as it can adjust and set a relative distance between the observed object 1 and the convex lens 22.

The cylinder 31 of the video signal converting section is fitted in the lens barrel 21 through the open upper end of the lens barrel 21 in a manner to be slidable in the axial direction of the video microscope while relatively closely contacting with an inner surface of the lens barrel 21. Between the lens barrel 21 and the cylinder 31 of the video signal converting section is arranged an enlargement (reduction) magnification and focus adjusting mechanism 24 for varying and adjusting enlargement (reduction) magnification and focus of the lens system.

In the illustrated embodiment, the enlargement (reduction) and focus adjusting mechanism 24 may be constructed in the following manner. More particularly, the cylinder 31 of the video signal converting section is provided on a front side thereof with an enlargement (reduction) magnification scale 36 which uses an upper edge 21a of the lens barrel 21 as an indication. Also, the cylinder 31 of the video signal converting section is provided on one side thereof with a rack 35 so as to extend in an axial direction of the cylinder 31 and correspondingly, the lens barrel 21 is provided on a side thereof corresponding to the rack 35 with a cover 25, in which a pinion 6 is supported through a shaft 27 so as to be operatively engaged with the rack 35. The cover 25 is mounted on each of both sides thereof with a rough-adjustment knob 28 of a large diameter for roughly adjusting magnifying power of the microscope and a fine-adjustment knob 29 of a small diameter for finely adjusting the magnifying power in order through the shaft 27 and coaxially. In the enlargement (reduction) magnification and focus adjusting mechanism 24 thus constructed, the rough-adjustment knob 27 is operated for roughly adjusting enlargement (reduction) magnifying power and then the fine-adjustment knob 28 is operated to finely adjusting it. This permits the enlargement (reduction) magnification or magnifying power to be adjusted over a relatively wide range as large as about 1 to 200 magnifications and, if required, as large as about 20 to 500 magnifications as desired and permits the focus adjustment to be carried out at the magnifying power thus set.

The enlargement (reduction) magnification and focus adjusting mechanism 24 may be constructed in any other suitable manner so far as the adjusting and fixing of magnifying power and focus of the lens system can be carried out by sliding the cylinder 31 of the video signal converting section relative to the lens barrel 21.

Thus, in the video microscope of the illustrated embodiment constructed as described above, adjustment of a relative distance between the observed object 1 and the convex lens 22 acting as an objective surface of the lens system by the objective distance adjusting mechanism 13 and adjustment of magnifying power and focus of the lens system by the enlargement (reduction) magnification and focus adjusting mechanism 24 permit an image of the observed object 1 lighted by the illuminating light source 12 to be clearly projected on the two-dimensional CCD element 32 at the magnifying power desired for pick-up of the image, resulting in a signal of the image picked up being taken out to the outside.

Figure 5A:
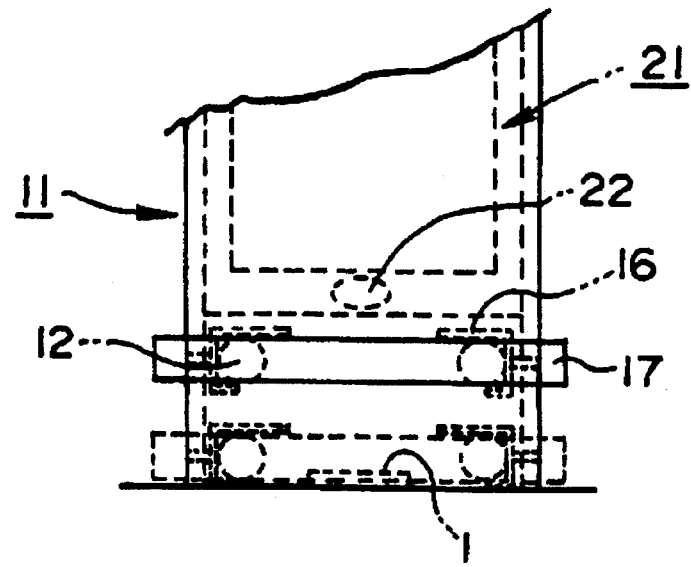
FIG. 5(a) is a fragmentary front elevation view showing an essential part of an illuminating light source.
Figure 5B:
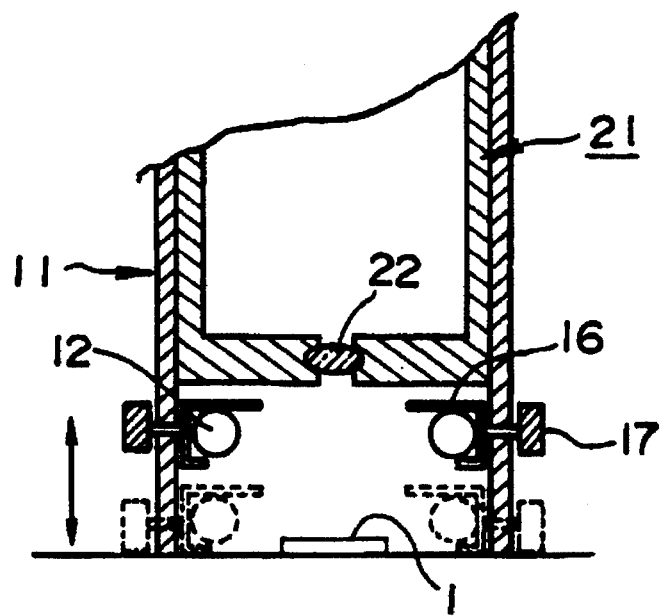
FIG. 5(b) is a fragmentary sectional view of the illuminating light source shown in FIG. 5(a)

The illuminating light source 12 provided in the observation stand 11 will be arranged in such a manner as shown in FIGS. 5(a) and 5(b). More particularly, the illuminating light source 12 is held on a light holder 16. The observation stand 11 is provided on an outside thereof with an adjusting ring 17, so that the light holder 16 and therefore the illuminating light source 12 is slidable along a slot relative to the observed object 1 in the axial direction of the observation stand 11 for adjustment.

Thus, use of a mechanism for adjusting a lighting position of the illuminating light source 12 with respect to the observed object 1 permits a lighting angle of the illuminating light source with respect to the observed object 1 to be set as desired, so that a clearer image of the observed object 1 may be picked up.

Figure 6:
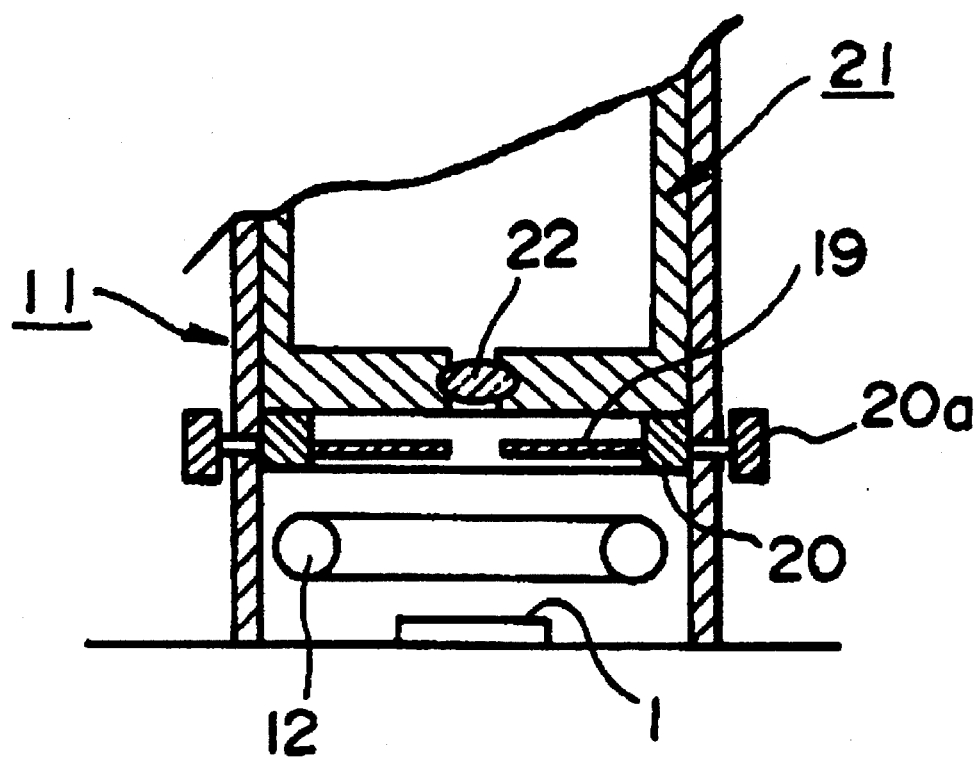
FIG. 6 is a fragmentary sectional view showing an arrangement in which a variable constriction is provided on an image pickup optical path of a video microscope.

In the illustrated embodiment, a combination of a variable constriction 19 and a constriction adjusting mechanism 20 may be provided in such a manner as shown in FIG. 6. More specifically the variable constriction 19 and the constriction adjusting mechanism 20 operatively connected to the variable constriction 19 to adjust the constriction 19 as desired are arranged in the observation stand 11 so as to be positioned on the image pickup optical path and below the convex lens 22. The constriction adjusting mechanism 20 is operatively connected to an adjusting knob 20a mounted on the outside of the observation stand 11. Such construction permits operation of the adjusting knob 20a to adjust a degree of opening of the variable constriction 19 through the constriction adjusting mechanism 20, so that the image of the observed object 1 may be more clearly picked up depending on brightness of the observed object 1.

As can be seen from the foregoing, the video microscope of the present invention is so constructed that the lens barrel in which the lens system is arranged on the image pickup optical path of the observed object received in the one open end of the observation stand is slidably positionally adjusted relative to the observation stand by means of the objective distance adjusting mechanism while exposing the observed object to light emitted from the illuminating light source arranged in the observation stand, resulting in a distance between the objective side of the lens system and the observed object being variably adjusted and set as desired. Also, the video microscope of the present invention is constructed in the manner that the cylinder of the video signal converting section in which the two-dimensional CCD element, driving circuit and the like are arranged is slidably adjusted relative to a predetermined position relative to the lens barrel by means of the enlargement (reduction) magnification and focus adjusting mechanism, resulting in setting of the enlargement (reduction) magnification of the lens system and adjustment of the focus of the lens system being continuously carried out as desired. Therefore, the present invention permits an image of the observed object to clearly projected onto the two-dimensional CCD element at desired magnifying power, resulting in being readily picked up. Thus, it will be noted that the present invention permits a variation in magnifying power of an image picked up to be carried out while eliminating a necessity of preparing lens systems required for the variation and carrying out lens replacement at every variation in magnifying power as in the prior art. Also, the present invention prevents a variation in magnifying power from being limited to a narrow range as in use of in a zoom lens system, so that the observed object may be readily observed over a wide range of magnifying power.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A video microscope comprising:

an observation stand forming an elongated enclosure having an inner surface and two open ends, one of said ends facing an observed object;

an illuminating light source positioned on the inner surface of the observation stand to light the observed object;

a lens barrel having a lens system at one end and slidably fitted in said observation stand through an open end of said observation stand opposite said open end facing said object;

said lens system being positioned on an image pickup optical path of the observed object;

said lens barrel having another end opposite said end slidably fitted in said observation stand, being open;

a video signal converting section including a cylinder;

said cylinder of said video signal converting section having a two-dimensional CCD element aligned along said optical path and having a driving circuit for driving said element, said cylinder being slidable through said another open end of said lens barrel;

an objective distance adjusting mechanism arranged between said observation stand and said lens barrel to adjust a distance between the observed object and an objective side of said lens system; and an enlargement/reduction magnification and focus adjusting mechanism arranged between said lens barrel and said cylinder of said video signal converting section to vary and adjust enlargement/reduction magnification of said lens system and adjust focus of said lens system.

2. A video microscope as defined in claim 1, further comprising an adjusting means having a slot for adjusting an illuminating position of said illuminating light source with respect to the observed object.

3. A video microscope as defined in claim 1, further comprising a variable constriction member and a constriction adjusting mechanism for adjusting a size of an opening of said variable constriction member for constricting light reflecting off said object and impinging on said lens system; and said variable constriction member and said constriction adjusting mechanism being arranged on said image pickup optical path of the observed object.

4. A video microscope as defined in claim 1, wherein:

said illuminating light source is positioned on the inner surface of the observation stand at a point between the end facing said lens system and the end facing said object to be observed.

5. A video microscope as defined in claim 1, wherein the illumining light source comprises:

a ring-shaped light formed around a perimeter of the inner surface of the observation stand for providing uniform light to the object to be observed.

\* \* \* \* \*